(12) United States Patent
Ubaldi et al.

(10) Patent No.: US 10,277,471 B2
(45) Date of Patent: Apr. 30, 2019

(54) METHOD AND DEVICE FOR NETWORK TOMOGRAPHY

(71) Applicant: Telefonaktiebolaget LM Ericsson (publ), Stockholm (SE)

(72) Inventors: Fabio Ubaldi, Pisa (IT); Teresa Pepe, Pisa (IT); Marzio Puleri, Pisa (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 19 days.

(21) Appl. No.: 15/529,819

(22) PCT Filed: Dec. 11, 2014

(86) PCT No.: PCT/EP2014/077371
§ 371 (c)(1),
(2) Date: May 25, 2017

(87) PCT Pub. No.: WO2016/091311
PCT Pub. Date: Jun. 16, 2016

(65) Prior Publication Data
US 2017/0324622 A1 Nov. 9, 2017

(51) Int. Cl.
*H04L 12/24* (2006.01)
*H04L 12/26* (2006.01)
(52) U.S. Cl.
CPC .............. *H04L 41/12* (2013.01); *H04L 43/04* (2013.01); *H04L 43/087* (2013.01);
(Continued)
(58) Field of Classification Search
CPC ..... H04L 41/12; H04L 43/04; H04L 43/0847; H04L 43/087; H04L 43/106; H04L 43/12
See application file for complete search history.

(56) References Cited

U.S. PATENT DOCUMENTS 9,769,044 B1\* 9/2017 Cirkovic ............. H04L 43/0876
2002/0116154 A1\* 8/2002 Nowak .................. H04L 41/12
702/186

(Continued)

FOREIGN PATENT DOCUMENTS

EP 1 657 851 A1 5/2006
EP 1 770 929 A1 4/2007
EP 2 254 277 A1 11/2010

OTHER PUBLICATIONS

OAM Requirements for Segment Routing Network by N. Kumar et al.—Jul. 1, 2014.

(Continued)

*Primary Examiner* — Kan Yuen
(74) *Attorney, Agent, or Firm* — Sage Patent Group

(57) ABSTRACT

A method of monitoring performance of a network using network tomography comprises obtaining (102) information indicative of topology of the network and computing (104) a plurality of paths for monitoring the network. Further the method comprises instructing (110) source nodes of the computed paths to send probing packets towards destination nodes of the computed paths, wherein said probing packets undergo segment routing in said network and instructing (114) the destination nodes of the computed paths to carry out network performance measurements based on probing packets received by the destination nodes. Finally the method comprises receiving (116) the performance measurements from the destination nodes and inferring (118) information about performance of nodes in the network using network tomography, wherein the inference process includes correlating the performance measurements of the computed paths.

14 Claims, 4 Drawing Sheets

(52) U.S. Cl.
CPC ............ *H04L 43/106* (2013.01); *H04L 43/12* (2013.01); *H04L 43/0847* (2013.01)

(56) References Cited

U.S. PATENT DOCUMENTS

| | | | |
|---|---|---|---|
| 2003/0110293 A1 | 6/2003 | Friedman et al. | |
| 2008/0031146 A1* | 2/2008 | Kwak | H04L 41/5003 370/250 |
| 2010/0027436 A1* | 2/2010 | Yamasaki | H04L 43/00 370/252 |

OTHER PUBLICATIONS

Series G: Transmission Systems and Media, Digital Systems and Networks; Packet over Transport aspects—Ethernet over Transport Aspects; Series Y: Global Information Infrastructure, Internet Protocol Aspects and Next-Generation Networks; Internet protocol aspects—Operation, administration and maintenance; OAM functions and mechanisms for Ethernet based networks; ITU-T; Telecommunication Standardization Sector of ITU; G-8013/Y.1731—Nov. 2013.

A One-Way Active Measurement Protocol (OWAMP) by S. Shalunov et al.—Sep. 2006.

A Two-Way Active Measurement Protocol (TWAMP) by K. Hedayat et al.—Oct. 2008.

Cisco Service-Level Assurance Protocol by M. Chiba et al.—Jan. 2013.

Internet Tomography by Mark Coates, et al.—Jan. 2002.

Network Tomography: Estimating Source-Destination Traffic Intensities From Link Data by Y. Vardi; Journal of the American Statistical Association, vol. 91, Issue 433—Mar. 1996.

Segment Routing Architecture by C. Filsfils, Ed. et al.; Network Working Group; Internet-Draft; Intended status: Standards Track—Expires: Jan. 4, 2015.

International Search Report for International application No. PCT/EP2014/077371—dated Apr. 24, 2015.

\* cited by examiner

METHOD AND DEVICE FOR NETWORK TOMOGRAPHY

PRIORITY

This non-provisional application is a U.S. National Stage Filing under 35 U.S.C. § 371 of International Patent Application Serial No. PCT/EP2014/077371 filed Dec. 11, 2014, and entitled "Method And Device For Network Tomography."

TECHNICAL FIELD

The present invention relates to network management, in general, and in particular to a method and a device for monitoring performance of a network using network tomography.

BACKGROUND

Performance evaluation and diagnosis is an important aspect of network management for all kinds of networks. In the last years, networks evolved from delivering mainly communications to delivering diversified services including content (video, games, real time streaming) and/or data. As a result the networks have experienced impressive growth in terms of infrastructure (routers and links that have been added) as well as of the number of users that they support. In this context, fault diagnosis and performance monitoring have become extremely important for network service providers. Accurate and timely knowledge of the internal status of a network (e.g., delays on individual links, congestion level) is essential for various network operations such as route selection, resource allocation, and fault diagnosis.

In the case of large scale networks, which may be substantially unregulated and highly heterogeneous, a single network operator or provider may not have control over all segments of a network that impact upon relevant performance data for that operator or provider. Certain segments of the network may therefore be unobservable, as the cooperation of network elements within those segments cannot be obtained.

Network Tomography has emerged as a promising technique enabling unobservable network performance parameters to be inferred without requiring cooperation of internal network components. Unobservable parameters are inferred solely on the basis of end-to-end (E2E) measurements conducted using edge nodes. Referring to the network 600 illustrated in FIG. 6, a series of probing paths is defined through the network, the probing paths originating and terminating with edge nodes 602-614 and traversing internal nodes 616-622. E2E measurements on data packets transmitted on the probing paths may be conducted with the cooperation of the edge nodes 602-614.

Network Tomography can work using both passive and active measurements. In the first case the system can use connections already present in the network to obtain aggregate path-level information without affecting traffic load. However, the coverage provided by such connections could not span all the paths of interest. If the available connections are not sufficient to uniquely identify all link metrics from path measurements, active probing is required. In this case, it is assumed that a set of boundary nodes is able to send probing packets to another set of edge nodes in order to measure packet attributes on the end-to-end path. However, this approach could have a potential limitation related to the possibility to freely select the paths through which probing packets are sent. Indeed, consecutive probing packets from a single source point to a specific destination could follow different paths due to routing changes or configured load balancing that can force a percentage of traffic onto an alternative link. As a result, if Network Tomography is used to infer network performance parameters the results may not be reliable because the probing packets travelling along different routes experience different delays, different jitter and/or packet loss along the route. In consequence Network Tomography findings based on a pair of source and destination nodes will not be accurate.

SUMMARY

It is the object of the present invention to obviate at least some of the challenges discussed above.

According to a first aspect of the present invention there is provided a method of monitoring performance of a network performed in a network tomography device. The method comprises obtaining information indicative of topology of the network and computing a plurality of paths for monitoring the network. Further, the method comprises instructing source nodes of the computed paths to send probing packets towards destination nodes of the computed paths, wherein said probing packets undergo segment routing in said network and instructing the destination nodes of the computed paths to carry out network performance measurements based on probing packets received by the destination nodes. In the following steps the performance measurements are received from the destination nodes and the method also comprises inferring information about performance of nodes in the network using network tomography, wherein the inference process includes correlating the performance measurements of the computed paths.

According to a second aspect of the present invention there is provided a device for monitoring performance of a network using network tomography comprising a processor and a memory. The memory contains instructions executable by said processor. The device is operative to obtain information indicative of topology of the network and compute a plurality of paths for monitoring the network. Further the device is operative to instruct source nodes of the computed paths to send probing packets towards destination nodes of the computed paths, wherein said probing packets undergo segment routing in said network and instruct the destination nodes of the computed paths to carry out network performance measurements based on probing packets received by the destination nodes. The device for monitoring performance of a network is also operative to receive the performance measurements from the destination nodes and to infer information about performance of nodes in the network using network tomography, wherein the inference process includes correlating the performance measurements of the computed paths.

According to a third aspect of the present invention there is provided a device for monitoring performance of a network using network tomography. The device comprises a path selection module, a monitoring module and a network tomography module. The path selection module is configured to obtain information indicative of topology of the network and compute a plurality of paths for monitoring the network. The monitoring module is configured to instruct source nodes of the computed paths to send probing packets towards destination nodes of the computed paths, wherein said probing packets undergo segment routing in said network. The monitoring module is further configured to instruct the destination nodes of the computed paths to carry out network performance measurements based on probing packets received by the destination nodes. The network tomography module is configured to receive the performance measurements from the destination nodes and infer information about performance of nodes in the network using network tomography, wherein the inference process includes correlating the performance measurements of the computed paths.

Further features of the present invention are as claimed in the dependent claims.

The present invention provides the following advantages:
It allows for establishing a full coverage of network for performance monitoring that is unaware of the technology of the network between source and destination nodes.
Provides an efficient way of monitoring dynamic networks without or with reduced need of using topology discovery functionalities to discover network paths changes.
Allows for a simple, efficient and accurate method for collecting performance measurements.
Improves monitoring of segment routed networks handled by Network Management Systems trying to provide an integrated and centralized management for various types of networks.

BRIEF DESCRIPTION OF THE DRAWINGS

The present invention will be understood and appreciated more fully from the following detailed description taken in conjunction with the drawings in which.

DETAILED DESCRIPTION

Figure 1:
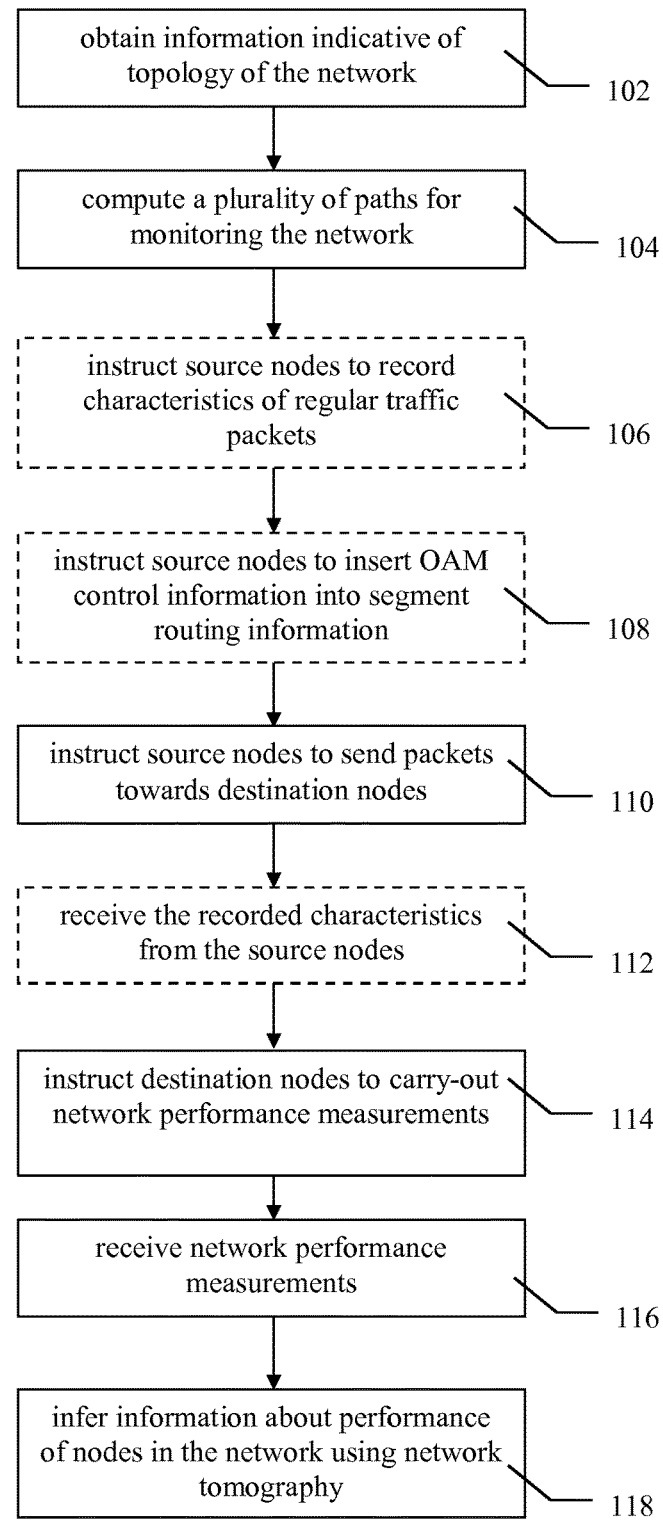
FIG. 1 is a diagram illustrating a method of monitoring performance of a network using network tomography in one embodiment of the present invention.

In the following description, for purposes of explanation and not limitation, specific details are set forth such as particular architectures, interfaces, techniques, etc. in order to provide a thorough understanding of the invention. However, it will be apparent to those skilled in the art that the invention may be practiced in other embodiments that depart from these specific details. In other instances, detailed descriptions of well-known devices, circuits, and methods are omitted so as not to obscure the description of the invention with unnecessary details.

Reference throughout the specification to "one embodiment" or "an embodiment" means that a particular feature, structure, or characteristic described in connection with an embodiment is included in at least one embodiment of the present invention. Thus, the appearance of the phrases "in one embodiment" or "in an embodiment" in various places throughout the specification are not necessarily all referring to the same embodiment. Further, the particular features, structures or characteristics may be combined in any suitable manner in one or more embodiments.

The inventors realized that accuracy of network tomography may be improved by using a technique known as segment routing (SR) and that SR may make easier the use of network tomography in the field. Segment routing is a technique to manage connection in IP and IP/MPLS domains described in *Segment Routing Architecture, IETF draft: draft-filsfils-spring-segment-routing*-04. SR architecture leverages on a per-flow source routing paradigm: for each flow, the ingress node inserts in the packet a list of instructions, called segments, on how the packet has to be treated by other nodes of the SR domain. Segments are represented with 32-bit field called Segment Identifier (SID). The main benefit of SR is to route and manage in a simpler and more scalable way paths in the packet domains. The simplicity and scalability of routing and management in SR is possible thanks to the following reasons:

Only the ingress node is aware of the state of the flow, while other transit and egress nodes only process the packet according to its header. With other technologies like RSVP the state is maintained by each node involved in the path. This characteristic of segment routing is advantageous for network tomography because it allows controlling the route the packet will follow.

Signalling protocol (RSVP, LDP) is no longer needed. Only routing protocol (like OSPF, IS-IS, etc) is used to distribute SID information in the SR domain.

Segment routing leads to reduction of databases (e.g. signalling databases) of up to two orders of magnitude and simplification of the router architecture.

In addition, SR allows performing existing IP and IP/MPLS procedures (like fast reroute, ECMP, TE paths) in a flexible and faster way that makes the solution suitable for SDN scenario.

Moreover, the inventors recognised that SR includes a native mechanism that allows selecting a pre-determined path for transmission of traffic between source and destination nodes without being affected by automatic routing changes or load balancing. This is very much in contrast with networks that do not employ SR, but RSVP where there is no control of the path being established.

With reference to FIG. 1 an embodiment of a method of monitoring performance of a network using network tomography is now to be described. The method in a preferred embodiment is implemented in a network comprising a plurality of nodes, some of which are edge nodes, i.e. nodes forming an entry to the network or network domain. The method comprises obtaining, 102, information indicative of topology of the network. Depending on embodiment topologies may be known from the beginning when the operator builds the network or the topology information may be gathered using topology discovery algorithms: e.g. statistical methods that broadcast packets in the network and check their delays at all the receiving points trying to infer the presence of nodes and links in the network. Once the topology information is available the method calculates 104 a plurality of paths for monitoring the network. The calculated paths connect source and destination nodes, which in a preferred embodiment are edge (or border) nodes of the network. In the following step source nodes of the computed paths are instructed, 110, to send probing packets towards destination nodes of the computed paths, wherein said probing packets undergo segment routing in said network. The destination nodes, in turn, are instructed, 114, to carry out network performance measurements based on probing packets they receive from the source nodes. In the following step the device implementing network tomography receives, 116, from the destination nodes results of the performance measurements carried-out by said destination nodes and then infers, 118, information about performance of nodes in the network using network tomography. The inference process includes correlating the received performance measurements of the computed paths. Various implementations of network tomography are known and will not be discussed here. In embodiments of the present invention an important advantage is the greatly improved accuracy of monitoring performance of a network by using for network tomography packets undergoing segment routing. The topology information needed to know the physical structure of the network may be known from the beginning or it can be provided through topology discovery. However, once the topology is known, and if it does not change physically, there is no need to do discovery. Segment routing gives complete control of the paths, which is not possible when SR is not used. In the latter case it is necessary to perform topology discovery every time the network optimize its logical paths, in order to discover paths that are in use.

Figure 2A:
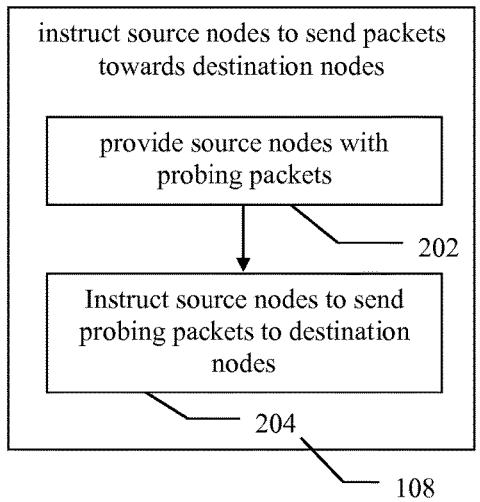
FIG. 2A and FIG. 2B are diagrams illustrating a step of instructing network nodes in one embodiment of the present invention.
Figure 2B:
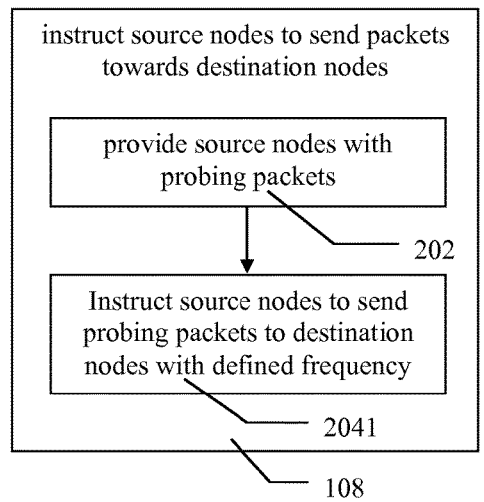

The packets sent from source to destination and used for network tomography are referred to as probing packets and said probing packets may be implemented in different ways. In one embodiment the probing packets are dummy packets generated at the source node or in the network tomography (NT) device and delivered, 202, to the source nodes for onward transmission towards the destination nodes. In the case of using dummy packets as probing packets the source nodes are instructed 204 or 2041 to transmit these probing packets towards destination nodes. Two variants of this embodiment are illustrated in FIGS. 2A and 2B. In a preferred embodiment the dummy packets are sent out from the NT device already with the right pace (or frequency) and the NT device instructs the source node to send these probing packets to the destination node, but does not instruct the source node to control their frequency (FIG. 2A). In an alternative embodiment a traffic shaper inside the source node may be set to control the probing packet pace (or frequency of sending the probing packets) based on input from the NT device (FIG. 2B). In yet another alternative the traffic shaper may set the pace of transmission of the probing packets autonomously and report the value indicative of the pace to the NT device for later analysis (not shown in the figures). These embodiments make measurements and their analysis relatively easy, because any delay, jitter, packet loss and other characteristics of the traffic detected at the destination nodes are results of the packets traversing the network along the computed paths.

In an alternative embodiment packets of a regular traffic may be used as probing packets. However, because these packets already travelled through a network before they arrived at the source nodes for further onward transmission towards the destination nodes they already carry certain "history" in the form of jitter, path delay and/or packet loss. In order to factor in these characteristics the method comprises instructing, 106, the source nodes to record characteristics of regular traffic packets before forwarding said regular traffic packets towards the destination nodes. For example, if the jitter at source node is known it is relatively easy to calculate how much jitter has been added along the path between the source and destination nodes by measuring total jitter at the destination node. The same is applicable, for example to BER (bit error ratio). If this embodiment is implemented the network tomography device in addition to measurements received from the destination nodes also receives, 112, the recorded characteristics from the source nodes.

In network tomography the internal nodes along the path are unaware of being monitored. The only nodes aware of something related to the method are the source and destination nodes. Usually, when monitoring performance of a network, we are interested in understanding where congestion is occurring in the network or where a fault is located (resulting in loss of packets or increased BER). Therefore, typically Operation And Maintenance (OAM) operations refer to BER, packet loss and congestion measurements. The first two are also used to identify damages in the network (nodes and/or links).

In order to determine parameters like BER, congestion and jitter it is enough to measure the inter-arrival time of probing packets at the destination node or check the content of the arrived probing packet (e.g. for BER). However, other measurements like path delay or packet loss require that certain OAM control information is inserted into segment routing information of a packet for transmission along the computed path to the destination node. Preferably the OAM control information is inserted into header of the probing packet. In order to measure path delay timestamp information is preferably added to the probing packet to allow for determining of this parameter. For instance, in the case of the path delay estimation a timestamp is introduced at the source node (by the source node itself under instruction from the Network Tomography device or by the Network Tomography device). Once the probing packet is received at the destination node the timestamp value is subtracted from the arrival time at the destination node to detect the delay along the path.

In another embodiment, for measurements of packet loss, the OAM control information inserted into the segment routing information may include a packet sequence number. The value of the sequence number is incremented by one for each probing packet sent from the source. The destination can use this value to detect if a probing packet is lost along the path and estimate the loss ratio.

Preferably, the OAM information inserted in the probing packet is used only at the destination node and it is not processed by internal nodes which are unaware of the monitoring. In addition to providing the necessary input data the OAM control information indicates measurements to be performed at the destination node.

The measurement at the destination node refers to the complete path as whole. Network Tomography then infers the contribution of each node and link identifying in this way the critical nodes and links. Network Tomography performs cross-correlation of measurement information from the plurality of paths to infer the performance of individual nodes. In a preferred embodiment Network Tomography also infers performance of links connecting the nodes of the network.

As discussed earlier SR includes a native mechanism that allows for choosing a pre-determined path without being affected by automatic routing changes or load balancing. In the case of a node or link failure, in a network operating Segment Routing, involving an element of a path used for monitoring there is no need to modify the probing path because this probing path is used to detect such a problem. So, if a link breaks, then the destination node is not receiving packets from the corresponding path (i.e. the path with the failed link). Network Tomography, at that point, integrates such information with information coming from the other probing paths and infers the location of the broken link. In case a link would be damaged before the setup of probing paths the routing protocol (like OSPF, IS-IS) can anyway distribute Segment Identifier (SID) information in the SR domain, so the mechanism still works correctly.

In yet another alternative embodiment the probing packets, with or without OAM information, may be generated directly by the network tomography device and the same network tomography device may also perform measurements on the received probing packet flows that are routed to it by the destination nodes. In this case the destination nodes do not perform measurements, but route probing packets to the network tomography device. In this alternative embodiment the steps of instructing, 114, the destination nodes to carry-out network performance measurements and receiving, 116, the performance measurements are replaced with steps of:

- instructing the destination nodes to forward received probing packets to a network tomography device;
- receiving the probing packets from the destination nodes; and
- carrying-out network performance measurements based on the probing packets received from the destination nodes.

Figure 3:
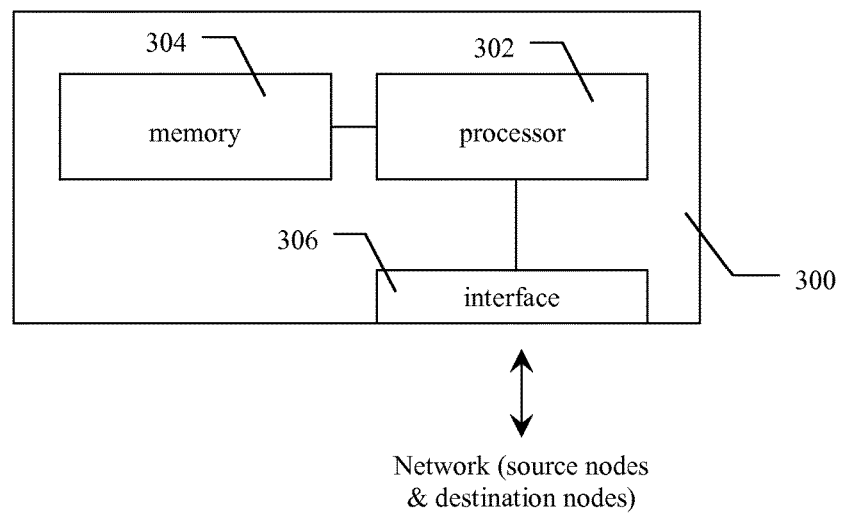
FIG. 3 is a diagram illustrating device for monitoring performance of a network using network tomography in one embodiment of the present invention.
Figure 4:
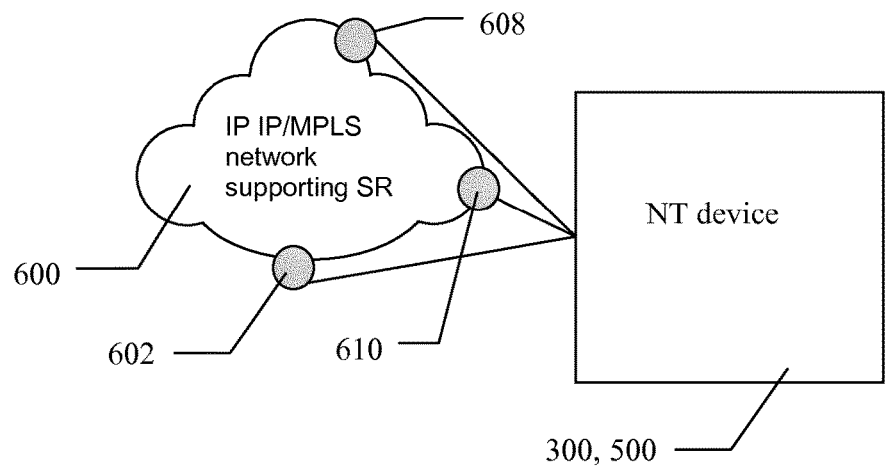
FIG. 4 is a diagram illustrating implementation of the device for monitoring performance of a network using network tomography.
Figure 6:
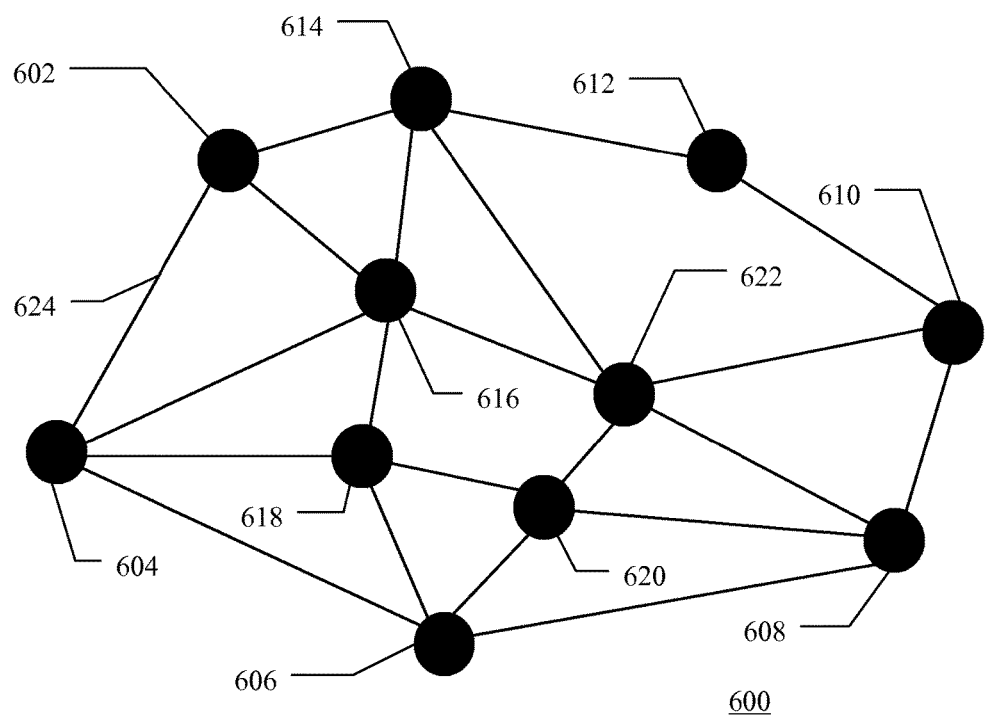
FIG. 6 is a schematic representation of a network.

With reference to FIGS. 3, 4 and 6 an embodiment of a device 300 for monitoring performance of a network 600 using network tomography is now to be described. The network 600 comprises a plurality of edge nodes 602-614 and a plurality of internal nodes 616-622, the nodes are connected by links and a sequence of links connecting two end nodes forms a path. In certain situation a path between two end nodes may comprise only one link (e.g. path 624 connecting nodes 602 and 604). In FIG. 6 one can see a plurality of E2E paths, for example 602-616-622-608; 614-622-610; 604-618-620-622-610; 610-622-620-606. As can be seen in the example of node 610 the same node may be a source node for one path as well as a destination node for another path.

In a preferred embodiment illustrated in FIG. 3 the device 300 for monitoring performance of a network using network tomography comprises a processor 302 and a memory 304. The memory 304 contains instructions executable by said processor 302, when the instructions are executed by the processor the device 300 operates according to embodiments of the method described earlier in connection with FIGS. 1 and 2. In short said device 300 is operative to obtain information indicative of topology of the network and compute a plurality of paths for monitoring the network. The topology information is used by the device 300 in computing the monitoring paths. In a preferred embodiment the computed monitoring paths traverse all nodes and all links connecting the nodes in the monitored network or domain. The device 300 is configured to instruct source nodes of the computed paths to send probing packets towards destination nodes of the computed paths. Depending on embodiment the instruction to send may take different form.

In one embodiment the instruction may refer to packets of a regular traffic, which are anyway transmitted to the destination nodes. In this embodiment packets of the regular traffic are used as probing packets. These packets of the regular traffic may already have certain jitter, path delay, packet loss and/or errors as they travelled through other network domains before being received at the source nodes for onward transmission towards the destination nodes. In this embodiment the source nodes are also instructed to record characteristics of the regular traffic packets. In this way the jitter, path delay, packet loss and/or errors are known at the entry to the monitored network or network domain.

In an alternative embodiment the instruction may refer to probing packets generated at the source node or in the network tomography device and delivered to the source nodes for onward transmission towards the destination nodes. The instruction itself may be implicit when the probing packets are generated in the network tomography device 300. In this embodiment if a source node receives a probing packet from the device 300 it is equal with an instruction to send this packet towards the source node as defined in the header of the probing packet. Alternatively, the instruction to send the probing packet to the destination node may be explicit in the form of a message from the device 300 to the source node 602. This explicit instruction may be used when the probing packets are generated at the source node as well as when they are generated in the device 300 and delivered to the source node 602. In one embodiment the probing packets are dummy packets, i.e. they do not carry any information. In the embodiment using probing packets generated at the source node or in the device 300 the instruction from the device 300 includes an instruction to transmit these probing packets towards destination nodes at a defined frequency, which makes measurements and their analysis relatively easy because any delay, jitter, packet loss and other characteristics of the traffic detected at the destination nodes are results of the packets traversing the network along the computed paths.

The probing packets sent from the source node 602 towards a destination node 608 undergo segment routing in the network 600. Although the description here refers to only one pair of source-destination nodes in practical embodiment the device 300 instructs plurality of source nodes to send probing packets towards respective destination nodes.

Further, the device 300 is configured to instruct the destination nodes (e.g. node 608) of the computed paths to carry out network performance measurements based on probing packets received by the destination nodes. The device 300 then receives the performance measurements from the destination nodes via a network interface. The network interface may be one of the well know network interfaces, for example an Ethernet card. In alternative embodiments different types of interfaces may be used depending on particular needs of the implementation. In a preferred embodiment the measurements are delivered via the interface to the processor 302, where a processing function operating in accordance with one of the known network tomography algorithms infers information about performance of nodes in the network. The inference process includes correlating the received performance measurements of the computed paths. In an alternative embodiment the measurements are performed at the device 300. In this case the destination nodes are not performing measurements directly, but forward the received probing packets to the device 300 that performs the measurements for all the flows. In this alternative embodiment, however, measuring at the device 300 could reduce the accuracy due to the traveling from the destination node to the device 300. Similarly, little loss of accuracy occurs also in the case when device 300 inserts a timestamp into the probing packet in comparison with the embodiment in which the timestamp is inserted by the source node.

In operation the device 300 may be connected to a plurality of edge nodes 602, 608, 610 (monitoring nodes) as it is shown in the embodiment illustrated in FIG. 4. In a preferred embodiment the device 300 may send to the monitoring nodes 602, 608, 610 probing packets and/or configuration data. Probing packets are not sent if the particular embodiment uses packets of regular traffic as probing packets. The configuration data is part of the various instructions sent to the monitoring nodes operating as source or destination nodes. Configuration data refers to the path to be followed that is provided to the source nodes and the configuration of destination nodes to extract measurements. The source nodes receive the path and use it to create the packet headers. A packet header includes information about the route to follow. Internal nodes are informed of a SID used in the header for routing by the use of a routing protocol (like OSPF, IS-IS) as it is normally used in segment routing.

As discussed earlier when in description of embodiments of the method in order to determine parameters like BER, congestion and jitter it is enough to measure the inter-arrival time of packets at the destination node or check the content of the arrived packet (e.g. for BER). However, in order to carry out measurements like path delay or packet loss in one embodiment the device 300 is configured to instruct the source nodes to insert certain OAM control information into segment routing information of a packet for transmission along the computed path to the destination node. In this embodiment the source nodes insert this OAM control information to the headers of the probing packets irrespectively of the origin of the packets (i.e. into packets of a regular traffic or into packets received from the device 300).

In an alternative embodiment, if the source nodes receive the probing packets from the device 300 the OAM control information may be inserted into the headers by the device 300.

In order to measure path delay timestamp information is preferably added to the probing packet. Once the probing packet is received at the destination node the timestamp value is subtracted from the arrival time at the destination node to detect the delay along the path.

In another embodiment, for measurements of packet loss, the OAM control information inserted into the segment routing information includes a packet sequence number. The value of the sequence number is incremented by one for each probing packet sent from source. This value can then be used to detect if a probing packet is lost along the path and to estimate the loss ratio.

In yet another alternative embodiment of the device 300 the probing packets, with or without OAM information, may be generated directly by the network tomography device 300 and the same network tomography device 300 may also perform measurements on the received probing packet flows that are routed to it by the destination nodes. In this case the destination nodes do not perform measurements, the network tomography device 300 is operative to receive the probing packets from the destination nodes. In this alternative embodiment the steps the device 300 does not instruct the destination nodes to carry-out network performance measurements and does not receiving the performance measurements. Instead the device 300 is operative to:
  instruct the destination nodes to forward received probing packets to the network tomography device 300;
  receive the probing packets from the destination nodes; and
  carry-out network performance measurements based on the probing packets received from the destination nodes.

Figure 5:
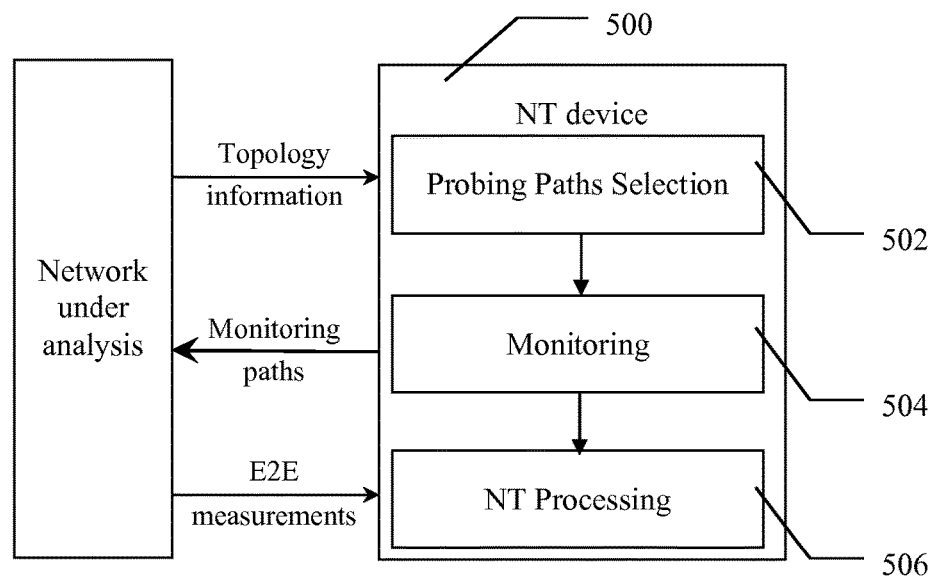
FIG. 5 is a diagram illustrating device for monitoring performance of a network using network tomography in an alternative embodiment of the present invention

With reference to FIGS. 4 and 5 an embodiment of a device 500 for monitoring performance of a network 600 using network tomography is now to be described. In a preferred embodiment the device 500 comprises a path selection module 502, a monitoring module 504 and a network tomography module 506. In one embodiment these modules may be realised as processes and/or functions operating in a processor running a software implementing a method as the one described in various embodiments in this document. In an alternative embodiment these modules may be implemented as discrete modules or a combination of discrete and software modules. The path selection module 502 is configured to obtain information indicative of topology of the network and compute a plurality of paths for monitoring the network. In a preferred embodiment the topology information may be known from the beginning when the network is built and entered into the device 500 as configuration data. Alternatively, this information may be gathered using one of the known topology discovery algorithms. The monitoring module 504 is configured to instruct source nodes of the computed paths to send probing packets towards destination nodes of the computed paths, wherein said probing packets undergo segment routing in said network. The monitoring module 504 is also configured to instruct the destination nodes of the computed paths to carry-out network performance measurements based on probing packets they receive. The network tomography module 506 is configured to receive the performance measurements from the destination nodes and to infer information about performance of nodes in the network using network tomography. The inference process includes correlating the received performance measurements of the computed paths.

Preferably, the monitoring module 504 is further configured to instruct the source nodes to insert OAM control information into segment routing information of a probing packet for transmission along the computed path to the destination node. Depending on embodiment the OAM control information inserted into a header of a SR probing packet includes a timestamp and/or a packet sequence number.

Also preferably, the monitoring module 504 is configured to provide the source nodes with probing packets for transmission to the destination nodes with a defined frequency.

In yet another preferred embodiment the monitoring module 504 is configured to instruct the source nodes to record characteristics of regular traffic packets (e.g. jitter and/or bit-error ratio) before forwarding said regular traffic packets as probing packets towards the destination nodes. In order to perform network tomography analysis the network tomography module 506 is configured to receive the recorded characteristics from the source nodes.

The device 500 communicates with the monitoring nodes (source nodes and destination nodes) via a network interface (not shown). The network interface may be one of the well know network interfaces, for example an Ethernet card. In alternative embodiments different types of interfaces may be used depending on particular needs of the implementation.

As explained earlier, Network Tomography is a technique that allows for inferring status of internal elements of a network from measurements performed only at its borders without the need of cooperation by the internal nodes. Often nodes are not supporting all the communication and OAM protocols (e.g. TWAMP, OWAMP . . . ) preventing the OAM functions from monitoring of the network. The nodes could be also belong to different domains like IP/MPLS and MPLS-TP that cannot interoperate together for OAM purposes, since they are not supporting the same functionalities and protocols (IP/MPLS has poor OAM functionalities). Another example where Network Tomography is especially effective is a multivendor network where service providers are not able to understand characteristics of the different network segments, since operators keep them secret. In all these cases Network Tomography is a way of bypassing the problem, since it is transparent to the network. When Network Tomography is combined with monitoring paths based on probing packets undergoing Segment Routing the accuracy of the findings of Network Tomography is greatly improved.

ACRONYMS USED

IP—Internet Protocol
MPLS—Multiprotocol Label Switching
SR—Segment Routing
SID—Segment ID
RSVP—Resource Reservation Protocol
LDP—Label Distribution Protocol
OSPF—Open Shortest Path First
IS-IS—Intermediate System to Intermediate System
ECMP—Equal-cost multi-path routing
TE—Traffic Engineering
SDN—Software Define Networking
NT—Network Tomography
BER—Bit Error Ratio
OAM—Operation And Maintenance
E2E—End To End
TWAMP—Two-Way Active Measurement Protocol
OWAMP—One-Way Active Measurement Protocol

The invention claimed is:

1. A method of monitoring performance of a network performed in a network tomography device, the method comprising:
    obtaining information indicative of topology of the network;
    computing a plurality of paths for monitoring the network;
    instructing source nodes of the computed paths to send probing packets towards destination nodes of the computed paths, wherein said probing packets undergo segment routing in said network; wherein the probing packets utilize packets of regular traffic for transmission towards the destination nodes;
    instructing the source nodes to insert Operation And Maintenance, OAM, control information into segment routing information of a probing packet of the probing packets for transmission along the computed path to the destination nodes;
    instructing the source nodes to record characteristics of regular traffic packets before forwarding said regular traffic packets as probing packets towards the destination nodes and receiving the recorded characteristics from the source nodes;
    instructing the destination nodes of the computed paths to carry out network performance measurements based on probing packets received by the destination nodes;
    receiving the performance measurements from the destination nodes; and
    inferring information about performance of nodes in the network using network tomography, wherein the inference process includes correlating the performance measurements of the computed paths.

2. The method according to claim 1, wherein the OAM control information inserted into the segment routing information includes a timestamp.

3. The method according to claim 1, wherein the OAM control information inserted into the segment routing information includes a packet sequence number.

4. The method according to claim 1, wherein the computed path connects two edge nodes of the network.

5. The method according to claim 1, wherein the inference process comprises inferring information about performance of links connecting the nodes in the network.

6. The method according to claim 1, wherein instructing the source nodes to send probing packets towards destination nodes includes providing the source nodes with probing packets for transmission to the destination nodes wherein the probing packets are transmitted with a defined frequency.

7. The method according to claim 1, wherein the characteristics of regular traffic packets include at least one of jitter or bit-error ratio.

8. A method according to claim 1, wherein the steps of:
    instructing the destination nodes to carry-out network performance measurements and
    receiving the performance measurements
    are replaced with steps of:
    instructing the destination nodes to forward received probing packets to a network tomography device;
    receiving the probing packets from the destination nodes; and
    carrying-out network performance measurements based on the probing packets received from the destination nodes.

9. A device for monitoring performance of a network using network tomography comprising a processor and a memory, said memory containing instructions executable by said processor, whereby said device is operative to:
    obtain information indicative of topology of the network;
    compute a plurality of paths for monitoring the network;
    instruct source nodes of the computed paths to send probing packets towards destination nodes of the computed paths, wherein said probing packets undergo segment routing in said network; wherein the probing packets utilize packets of regular traffic for transmission towards the destination nodes;
    instruct the source nodes to insert Operation And Maintenance, OAM, control information into segment routing information of a probing packet of the probing packets for transmission along the computed path to the destination nodes;
    instruct the source nodes to record characteristics of regular traffic packets before forwarding said regular traffic packets as probing packets towards the destination nodes and said device is further operative to receive the recorded characteristics from the source nodes;
    instruct the destination nodes of the computed paths to carry out network performance measurements based on probing packets received by the destination nodes;
    receive the performance measurements from the destination nodes; and
    infer information about performance of nodes in the network using network tomography, wherein the inference process includes correlating the performance measurements of the computed paths.

10. The device according to claim 9, wherein the OAM control information inserted into the segment routing information includes a timestamp.

11. The device according to claim 9, wherein the OAM control information inserted into the segment routing information includes a packet sequence number.

12. The device according to claim 9 further operative to infer information about performance of links connecting the nodes in the network.

13. The device according to claim 9 operative to provide the source nodes with probing packets for transmission to the destination nodes with a defined frequency.

14. The device according to claim 9, wherein the characteristics of regular traffic packets includes at least one of jitter or bit-error ratio.

\* \* \* \* \*